Figure 1:
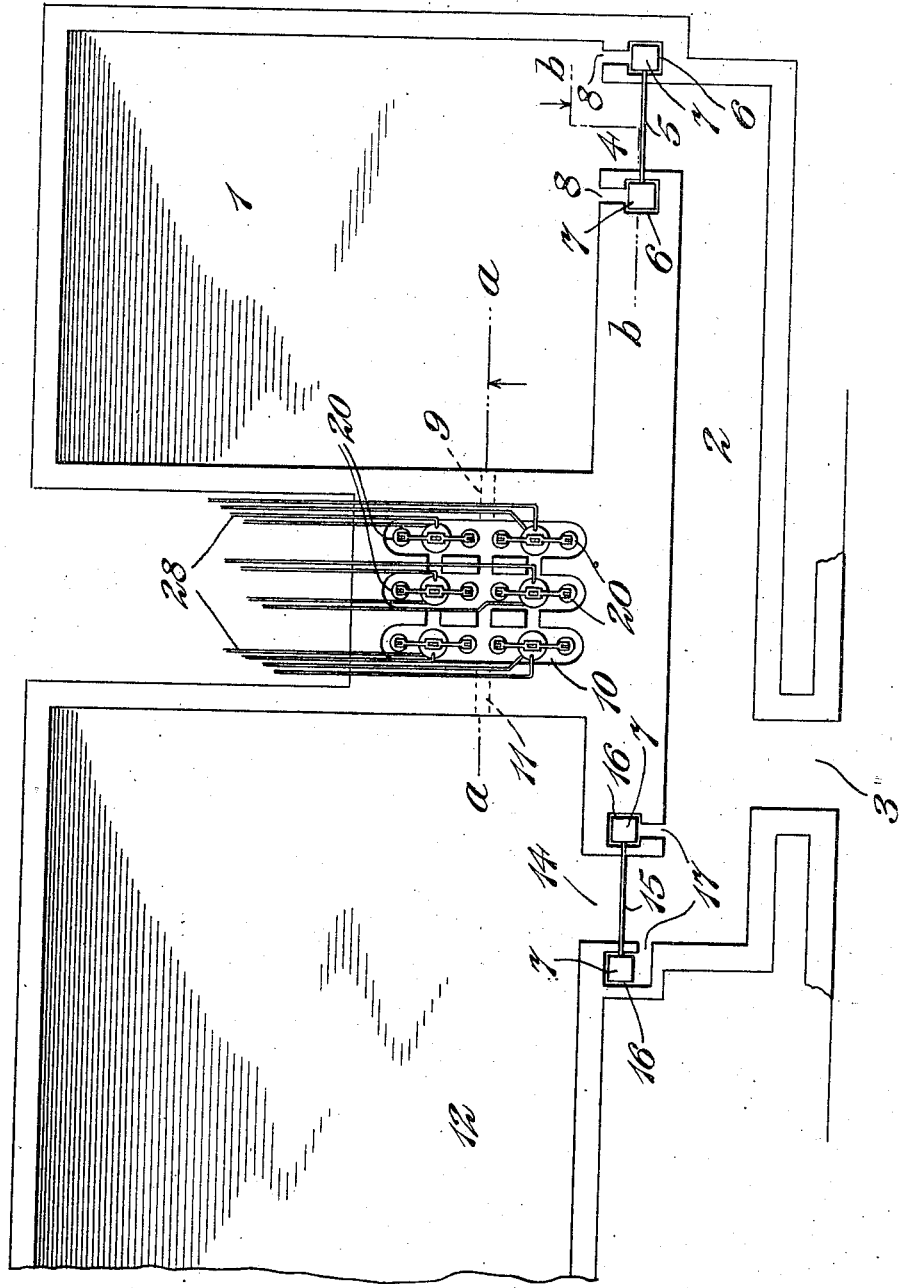

W. SCHWEIKERT.
TIDE MOTOR.
APPLICATION FILED MAR. 24, 1910.

1,012,722.

Patented Dec. 26, 1911.

6 SHEETS—SHEET 1.

WITNESSES

INVENTOR
William Schweikert

BY

ATTORNEY

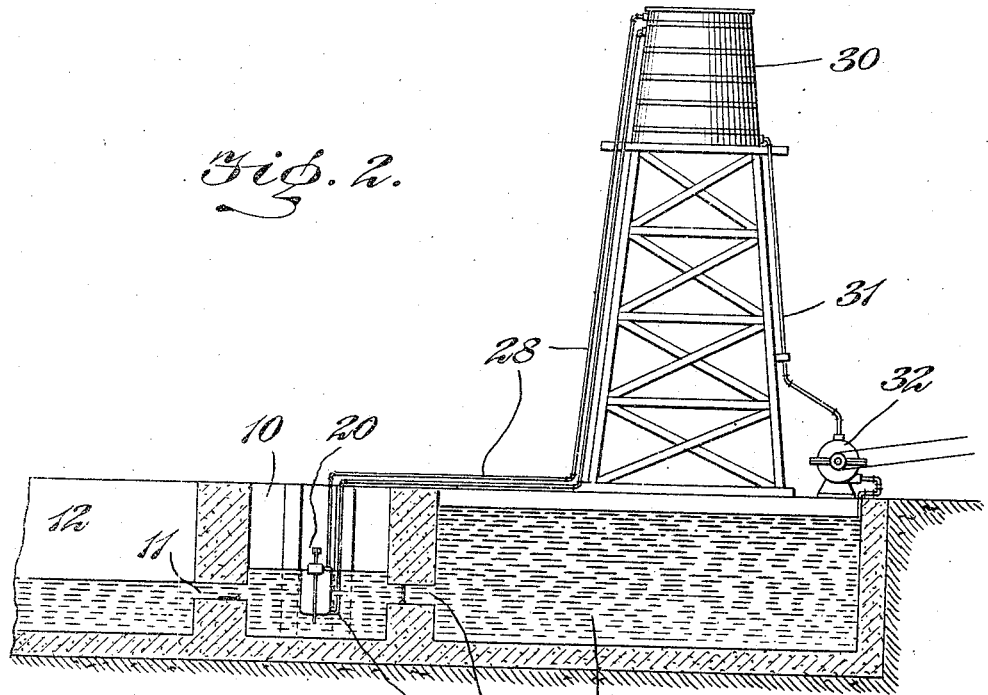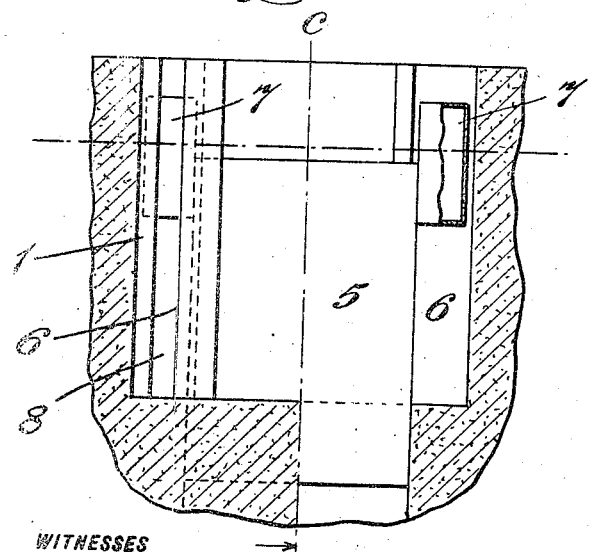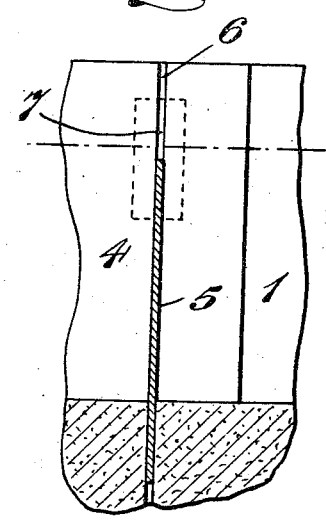

W. SCHWEIKERT.
TIDE MOTOR.
APPLICATION FILED MAR. 24, 1910.

1,012,722.

Patented Dec. 26, 1911.

6 SHEETS—SHEET 3.

WITNESSES

INVENTOR
William Schweikert
BY
ATTORNEY

W. SCHWEIKERT.
TIDE MOTOR.
APPLICATION FILED MAR. 24, 1910.
1,012,722.
Patented Dec. 26, 1911.
6 SHEETS—SHEET 4.
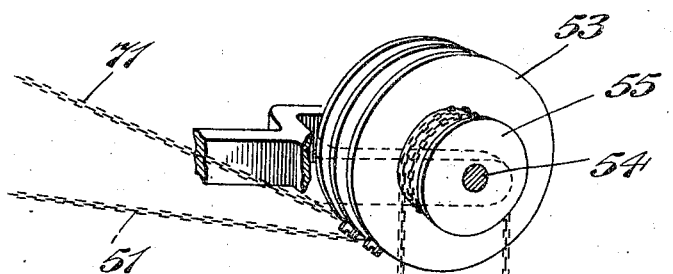
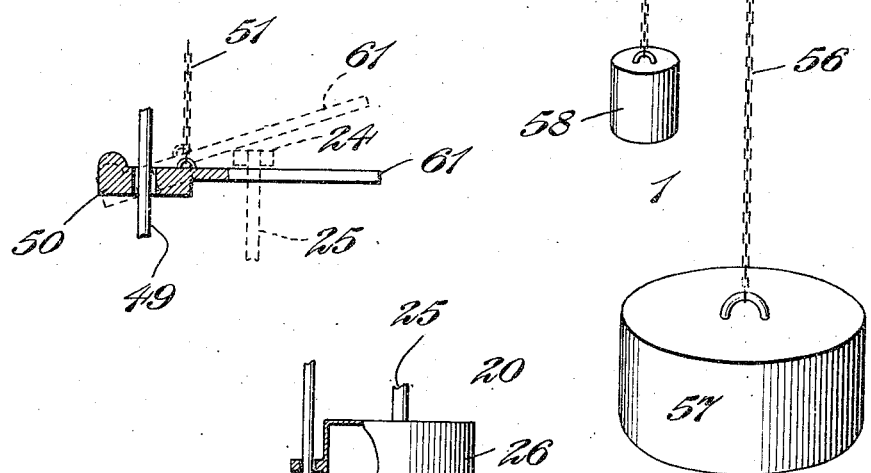
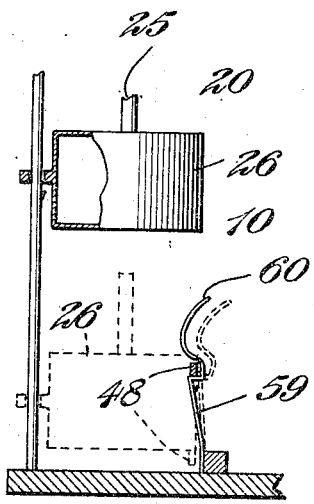
WITNESSES
INVENTOR
William Schweikert
ATTORNEYS

W. SCHWEIKERT.
TIDE MOTOR.
APPLICATION FILED MAR. 24, 1910.

1,012,722.

Patented Dec. 26, 1911.

6 SHEETS—SHEET 5.

WITNESSES

INVENTOR
William Schweikert
BY
ATTORNEY

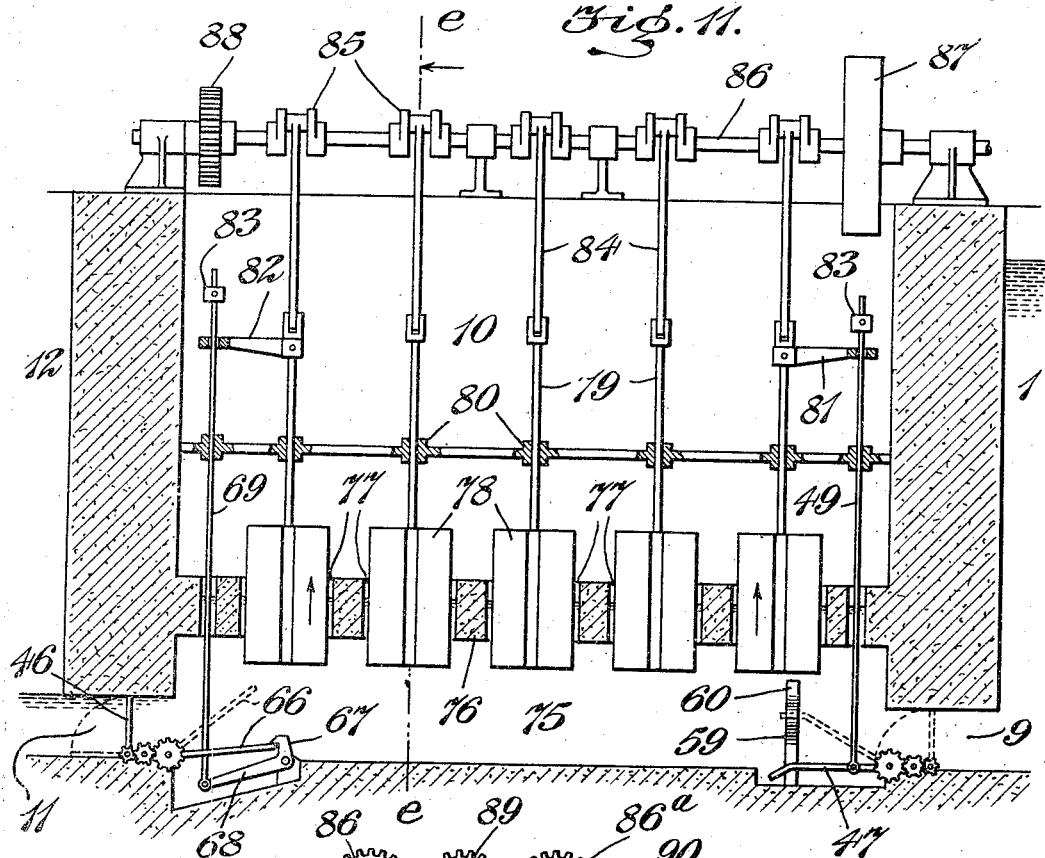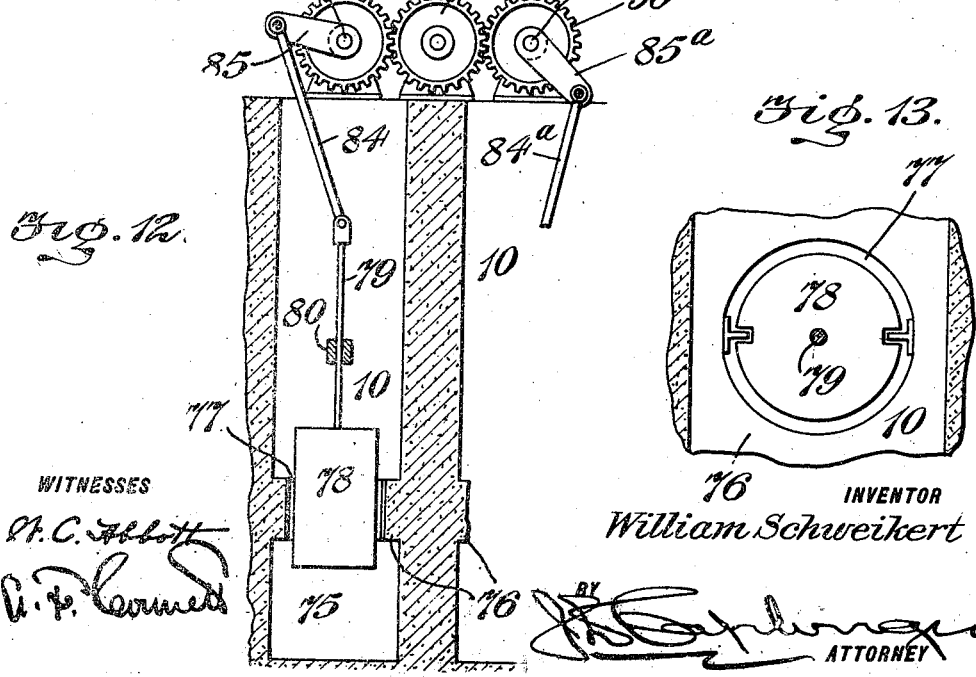

UNITED STATES PATENT OFFICE.

WILLIAM SCHWEIKERT, OF NEW YORK, N. Y.

TIDE-MOTOR.

1,012,722.　　　　　Specification of Letters Patent.　　Patented Dec. 26, 1911.

Application filed March 24, 1910. Serial No. 551,371.

*To all whom it may concern:*

Be it known that I, WILLIAM SCHWEIKERT, a citizen of the United States, and a resident of the borough of Brooklyn, in the city and State of New York, have invented certain Improvements in Tide-Motors, of which the following is a specification.

This invention relates to certain improvements in tide motors such as are particularly designed and adapted for actuation from the ebb and flow of tides, and has for its object to provide a motor of this general character of a simple and comparatively inexpensive nature, and of a compact and durable construction, having improved and simplified means whereby the tidal fluctuations are multiplied in such a manner as to permit of developing power therefrom in a substantially continuous and uniform manner.

The invention consists, in part, in a device of this general character having a receptacle to which water is adapted to be admitted during the flow of the tide, a lock capable of communication with said receptacle and adapted to be successively filled with water and emptied, and transmitting means actuated from the rise and fall of water in said lock.

The invention also consists in a device of this general character wherein the lock affords an entrance for the tide water into the receptacle, whereby upon the flow of the tide said lock may be successively operated, being first filled with water and afterward discharged into said receptacle for the successive actuation of the transmitting means.

The invention also consists in a motor of this general character wherein the receptacle is adapted to be filled with water upon the flow of the tide and to discharge the same through said lock in such a manner as to actuate the transmitting means therein located.

Another part of the invention consists in a motor having a receptacle to which water is adapted to be admitted upon the flow of the tide, a lock capable of communication with the receptacle and adapted to be successively filled with water and discharged, transmitting means actuated from the rise or fall of water in the lock, and means for controlling the admission and discharge of water to and from said lock.

The invention also contemplates certain novel features of the construction and combinations and arrangements of the several parts of the improved tide motor, whereby certain important advantages are attained, and the device is rendered simpler, less expensive and otherwise better adapted and more convenient for use, all as will be hereinafter fully set forth.

The novel features of the invention will be carefully defined in the claims.

In order that my invention may be the better understood, I will now proceed to describe the same with reference to the accompanying drawings, wherein—

Figure 5:
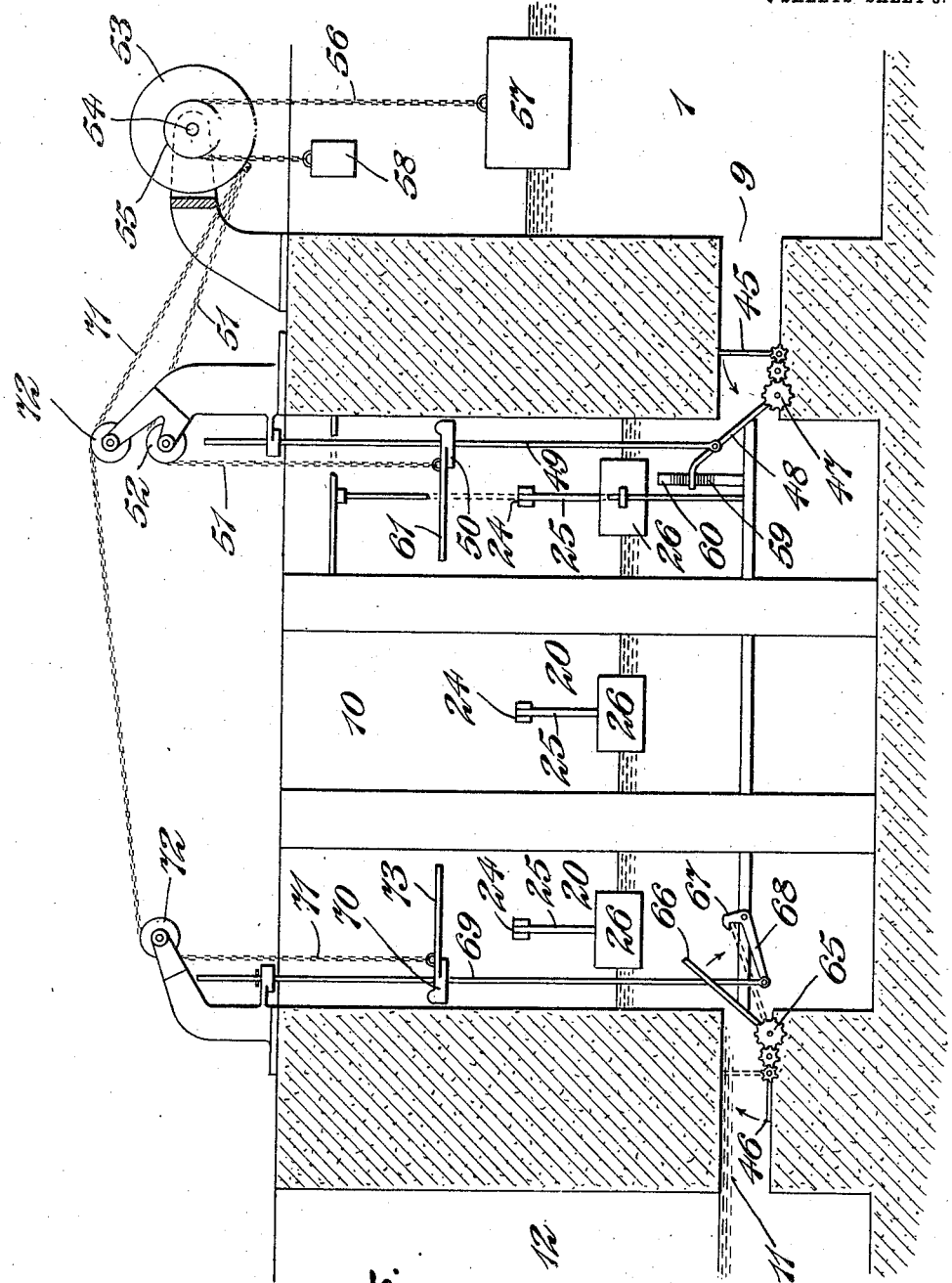
Figure 9:
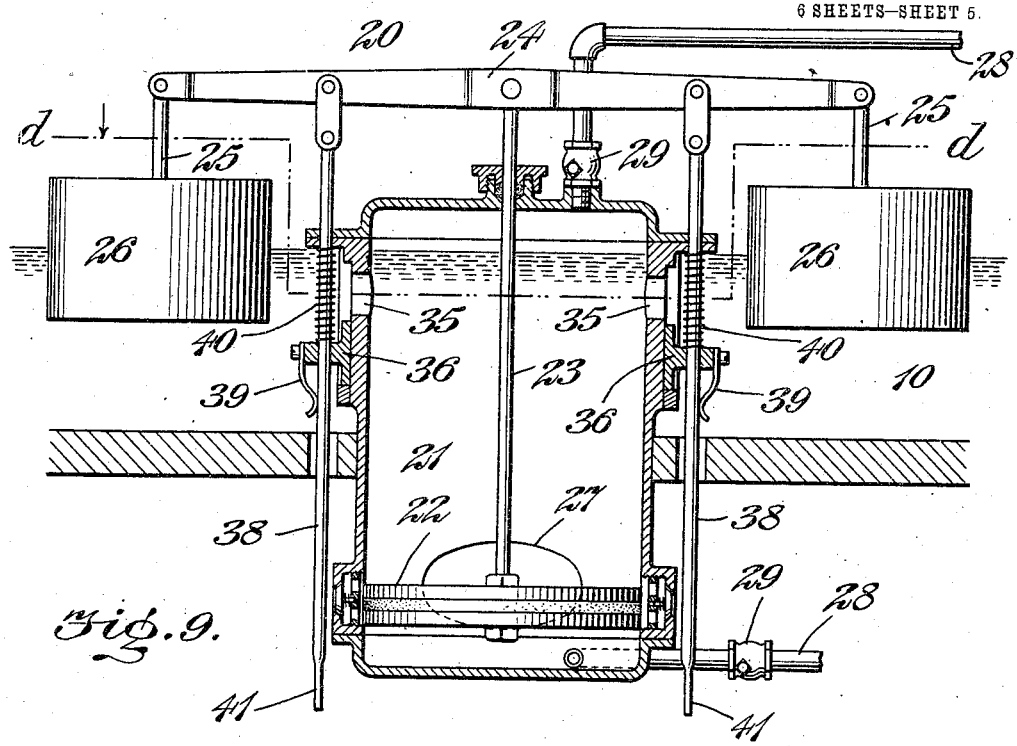
Figure 10:
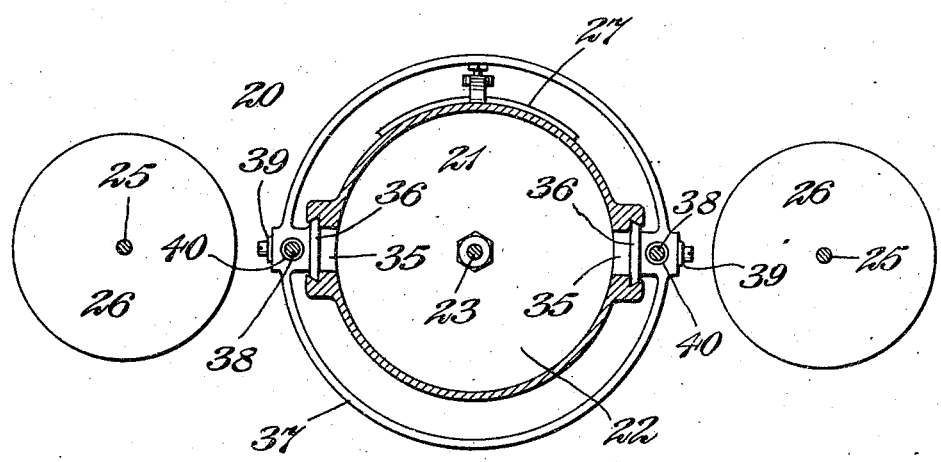

Figure 1 is a partial plan view showing a motor constructed according to my invention; Fig. 2 is a vertical section taken through the lock and adjacent parts of the apparatus in the plane indicated by the line $a$—$a$ in Fig. 1; Fig. 3 is a vertical section taken through one of the gates in the plane indicated by the line $b$—$b$ in Fig. 1; Fig. 4 is a vertical section taken through said gate in the plane indicated by the line $c$—$c$ in Fig. 3; Fig. 5 is a sectional view taken vertically through the lock, and showing certain features of the mechanism for filling and emptying the same; Fig. 6 is a perspective view showing the float mechanism for controlling the admission and discharge of water to and from the lock; Fig. 7 is a sectional detail view showing features of the clutch for actuating the wickets of the lock; Fig. 8 is a sectional view showing details of construction of the wicket actuating means; Fig. 9 is a sectional view taken vertically through the transmitting means; Fig. 10 is a transverse section taken horizontally through the transmitting means in the plane indicated by the line $d$—$d$ in Fig. 9; Fig. 11 is a sectional view taken vertically through the lock and showing a modified formation of the transmitting means; Fig. 12 is a sectional view taken at right angles to Fig. 11 in the plane indicated by line $e$—$e$ in said figure, and Fig. 13 is an enlarged fragmentary detail view showing one of the elements of the transmitting means illustrated in Figs. 11 and 12.

Referring first to Figs. 1 to 10 inclusive, 1 represents a receptacle which may be conveniently constructed in the form of a large basin to which tide water is admitted by way of a canal or passage 2, one end of which is adapted for communication with the sea as indicated at 3, while the opposite end is adapted for communication as shown at 4 with said basin or receptacle, a gate 5 being interposed in the passage or canal for preventing the discharge of water from the basin or receptacle upon the ebb of the tide.

As herein shown, the gate 5 is capable of vertical movement, its opposite edges being arranged to slide within guide channels 6, 6, produced at the opposite sides of the canal or passage, the said edge portions of the gate being provided with floats 7, 7, which are adapted to rise and fall with the fluctuations of the water level in the basin or receptacle 1, there being passages 8, 8, which lead from the basin or receptacle 1 to said guide channels 6, 6, so that the water in said guide channels is maintained at a level equal to that of the water in the basin or receptacle at all times. By this construction it will be seen that when the level of the water in the basin or receptacle 1 falls, the gate 5 will be correspondingly lowered so that if the tide flowing in the canal or passage 2 be at a height greater than the water level in the basin, the water from the said canal or passage will be admitted into the basin or receptacle, but when the water level in said basin or receptacle stands above the level of the tide as exerted in the canal or passage 2, the floats 7, 7 will operate to elevate the gate so as to prevent discharge of water from the basin or receptacle through said canal or passage.

9 represents a wicket produced at one wall of the basin or receptacle 1, and adapted for the flow of water therefrom into a lock or compartment 10, and 11 represents a similar wicket produced in the wall of said lock or compartment and adapted for the discharge of water therefrom into the auxiliary basin or receptacle 12, similar to the basin or receptacle 1, but ordinarily of greater capacity than the latter.

In the form of my improved motor herein illustrated, I have provided transmitting means within the lock or compartment 10 and adapted to be actuated from the rise and fall of water therein, and the construction is such that after the basin or receptacle 1 has been filled with water upon the flow of tide, such water is discharged therefrom by way of the lock or compartment 10 which is successively filled and emptied for the actuation of the transmitting means therein contained. The auxiliary basin or receptacle 12 being of greater capacity than the basin or receptacle 1, it will be seen that after the latter has been filled with water upon the flow of the tide, the lock or compartment may be filled and emptied a considerable number of times before the water level in the auxiliary basin or receptacle 12 corresponds with that of the basin or receptacle 1, and if the basins or receptacles be properly proportioned and of sufficient capacity the transmitting means in the lock or compartment 10 may be actuated in a substantially continuous manner irrespective of tidal fluctuations.

The auxiliary basin or receptacle 12 has communication as shown at 14 with the canal or passage 2 so that upon the fall of the tide said basin or receptacle may be emptied, a gate 15 being extended across said canal or passage to control its communication with said auxiliary basin or receptacle in a manner similar to that in which communication of said canal or passage with the basin 1 is controlled by the gate 5, the opposite edges of said gate 15 being extended for vertical sliding movement in guide channels 16, 16 in the opposite walls of the canal or passage, and being provided with floats 7 which rise and fall with the fluctuations of the tide in the canal or passage 2, there being openings 17 in the walls of said canal or passage through which tide water is admitted to said guide channels. By this arrangement as the tide falls in the canal or passage 2, the gate 15 is lowered so that water may escape from the auxiliary basin or receptacle 12, and as the tide rises in said canal or passage 2, the gate 15 is correspondingly elevated to prevent said auxiliary basin or receptacle from becoming filled with water during the flow of the tide.

The transmitting means herein shown in the lock or compartment 10 comprises a plurality of similar members or elements 20, 20 each of which has a cylinder 21 of suitable capacity wherein is movable a septum 22 having a rod 23 extended upwardly at the axis of the cylinder and penetrating the upper end or head thereof, and having its upper extremity connected with a horizontally directed beam 24 the opposite ends of which are extended beyond opposite sides of the cylinder, and are bifurcated for connection with the upper ends of rods 25, 25 wherewith floats 26, 26 are connected, the arrangement of the parts being such that the floats 26 are raised and lowered in unison with the rise and fall of the water within the lock or compartment 10 and are caused to communicate their movement to the septum 22 which is thereby reciprocated within the cylinder 21. The cylinder 21 has a man-hole produced at its lower end and provided with a tight fitting cover 27 which is capable of removal so that sediment may be withdrawn from the cylinder when desired, and the upper and lower ends of said cylinder have pipe connections 28 provided with check valves 29, and means provided for admitting water to the ends of said cylinder as will be hereinafter explained, so that when the septum is moved within the cylinder the water is forced therefrom first through one of the pipe connections 28, and then through the other. As shown herein the pipe connections 28 are led to an elevated tank or receptacle 30 wherein the water forced from each cylinder is collected, said tank or receptacle 30 having a discharge pipe 31 leading to a hydraulic motor 32, from which power may be communicated to drive any desired mechanism. The means for admitting water to the cylinder 21 shown herein, comprises ports 35, 35 located at diametrically opposite sides of the upper part of the cylinder and controlled by vertically movable valves 36, 36 which are connected for movement in unison by means of a ring 37 encircling the upper end of the cylinder, said valves being guided in any preferred way upon the side walls of the cylinder. 38, 38 represent vertically movable valve rods which are extended through apertured lugs upon the valves 36, 36 and having their upper ends guided in apertured flanges at the upper end of the cylinder and are connected with the opposite ends of the beam 24 so that the vertical movement of the floats 26, 26 is communicated to said rods to move them in unison with the septum 22. Each valve 36 carries a spring 39 which has frictional contact upon the corresponding valve rod 38 so as to compel movement of the valve in unison with such valve rod and above the apertured lug of each valve a spring 40 is coiled upon the corresponding valve rod with its upper end engaged beneath the apertured flange wherein said rod is guided, so that the tension of said spring is exerted to press the corresponding valve 36 downwardly as shown in Fig. 9, to open the corresponding port 35. The tension of the spring 40 is not sufficient to move the valve 36 endwise upon its valve rod against the tension exerted by the spring 39 and it will be seen that when the floats 26 are lowered upon the fall of the water level in the lock or compartment 10, so as to open the ports 35; the upper end of the cylinder 21 upon the septum 22 will fill with water, and as the water level in the lock or compartment 10 rises, the lifting movement exerted by the floats 26 will operate through the rods 38 and springs 39 to first close the valves 36 against the tension of the springs 40 after which the upward movement of the septum 22 will operate to force the water from the upper end of the cylinder through the upper pipe connection 28 into the tank or receptacle 30. The lower ends of the rods 38 are flattened or reduced as shown at 41 whereby it will be seen that when the floats 26 have been raised to their uppermost position by the rise of the water level in the lock or compartment 10, the springs 39 will bear with lessened tension upon said rods so that the springs 40 are permitted to exert their tension to automatically force the valves 36 downwardly into the open position shown in Fig. 9, whereby while the water in the lock or compartment 10 remains at its highest level and the septum 22 is retained in an elevated position, the water is admitted from the lock or compartment 10 into the lower end of the cylinder 21 below the septum 22, so that when the water is discharged from the lock or compartment 10 through the wicket 11 into the auxiliary basin or receptacle 12, the downward movement of the floats 26 will be imparted to the septum 22 to first move the same downwardly within the cylinder to an extent sufficient to close the ports 35, and afterward to force the water from the lower end of the cylinder through the lowermost pipe connection 28 into the elevated tank or receptacle 30. While this arrangement of transmitting means is capable of advantageous use I do not desire to be understood as limiting myself thereto since it will be evident that the vertical reciprocatory movement of the floats may be communicated through devices other than that herein shown for utilizing the developed energy, and it will also be seen that instead of supplying the cylinder with water direct from the lock or compartment 10, said cylinder may be supplied with fresh water from any suitable source so as to be capable of supplying a system of distribution.

In connection with the transmitting devices above described I have herein shown the improved motor provided with means adapted for automatic operation for successively filling the lock or compartment 10 from the basin or receptacle 1 and emptying the same into the auxiliary basin or receptacle 12, said means comprising a gate 45 controlling the wicket 9 and a similar gate 46 controlling the wicket 11.

The gates 45 and 46 are pivotally mounted, the former being actuated through gearing 47 from an arm or lever 48 with which is connected a vertically movable rod 49, the upper end of which is guided in suitable bearing at the side of the lock so as to be capable of free vertical movement in unison with the arm or lever 48. 50 represents a clutch device capable of free downward vertical movement upon the rod 49 being suspended at the lower end of a chain or flexible connector 51 which is extended upwardly from the lock over a sheave 52 and laterally as shown in Fig. 5, and has its opposite end arranged to wind upon a drum 53 carried by a shaft 54 which has a smaller drum 55 over which is passed a chain or flexible connector 56, the lower end of which has connection with a float 57 while its upper end has connection with a weight 58. The arrangement of the parts is such that when the arm or lever 48 is raised the gate 45 is closed and vice versa, a spring 59 being adapted for engagement beneath said arm or lever when the same is raised so as to hold the gate 45 in closed position against the pressure of the water within the basin or receptacle 1.

The upper end of the spring 59 has a beveled or inclined surface 60 arranged in the path of one of the floats 26 whereby it will be seen that when water is discharged from the lock or compartment 10 through the wicket 11, causing the water level in said lock or compartment to fall, the downward movement of said float 26, as the same approaches the bottom of the lock or compartment, will cause said float to contact with the inclined extremity 60 of spring 59 in such manner as to withdraw said spring laterally from supporting engagement beneath the arm or lever 48 after which the further downward movement of said float will bring the same into contact with said arm or lever in such manner as to insure the opening of the gate 45 so that the lock or compartment 10 will be again filled with water from the basin or receptacle 1, and as the float 26 rises in unison with the rise of the water level in said lock or compartment 10, the end of the beam 24 wherewith said float has connection will be engaged beneath a projection 61 upon the clutch device 50 so as to tilt said clutch device to an inclined position such as shown in dotted lines in Fig. 7 whereby as the water level in the lock or compartment 10 approaches that in the basin or receptacle 1, a certain extent of upward movement will be imparted to the rod 49 sufficient to elevate the arm or lever 48 into supported engagement with the spring 59, the gate 45 being thereby closed to prevent the escape of further water from the basin or receptacle 1.

The level to which the lock or compartment 10 is filled will vary, during the operation of the device in unison with the variation of the water level in the basin or receptacle 1, but in the construction herein shown such variation will be compensated for by the automatic adjustment of the clutch device 50 in unison with the movement of the float 57 actuated from variations of the water level in the basin or receptacle 1.

The gate 46 which controls the wicket 11 is actuated through gearing 65 from an arm or lever 66 in such a manner that when said arm is in raised position said gate will be open, and when said arm is in lowered position as shown in dotted lines in Fig. 5 said gate will be closed.

67 represents a lever pivoted in the lock or compartment 10 and having a hook-shaped end adapted when the arm or lever 66 is lowered to engage therewith and hold the gate 46 closed against the pressure of the water in the lock or receptacle and said lever has an arm 68 with which is connected the lower end of a rod 69 which is extended vertically up at one wall of the lock and has its upper end engaged with a suitable guide, a clutch device 70 being mounted adjustably upon said rod and being supported at the lower end of a chain or connection 71 which is extended upwardly and transversely from the lock over sheaves 72 and has its opposite end arranged to wind upon the spool or drum 53 similarly to the chain or connection 51 above described, so that the position of said clutch device 70 is controlled directly from the variations of the water level in the basin or receptacle 1.

The upper end of the arm or lever 66 is arranged in the path of one of the floats 26, so that as the water level in the lock or compartment 10 falls said float contacts with said arm or lever and depresses the same to close the gate 46 when the water is completely discharged from the lock so that when the gate 45 is opened the water entering the lock therethrough is prevented from being immediately discharged into the auxiliary basin or receptacle. When said arm or lever is sufficiently depressed to close the gate 46 it is engaged by the hook lever 67 and is thereafter held against movement during such time as the lock or compartment is being filled with water from the basin or receptacle 1 by way of the wicket 9, and as the water level in the lock or receptacle rises through the admission of water from the basin or receptacle 1, the beam 24 connected with the float 26 which engages the arm or lever 66, will come in contact with a projection 73 upon the clutch device 70 and will tilt said clutch device to an inclined locking position whereby the final rising movement of the float will serve to move the rod 69 upwardly in such a manner as to rock the hook lever 67 and disengage the same from the arm or lever 66 at the instant the lock or receptacle is filled.

By this arrangement of the parts it will be seen that the lock or compartment 10 is first filled with water from the basin or receptacle 1, while the gate 45 is open and the gate 46 is closed and when the level of the water in the lock conforms to that in basin 1, the clutch devices will be actuated to reverse the positions of the gates, closing the gate 45 and opening the gate 46, so that the water is discharged from the lock into the auxiliary basin 12, and as the water is discharged from the lock the floats 26 approaching the bottom thereof will first release the arm or lever 48 and afterward move levers 48 and 66 downwardly so as to again open gate 45 and close gate 46 in order that the water from basin 1 may freely enter into the lock while being prevented from escaping therefrom at the wicket 11.

From the above description it will be seen that the improved tide motor constructed according to my invention is of an extremely simple and comparatively inexpensive nature, and is particularly well adapted for use by reason of the multiplication of the rising and falling movements of the water attained by its use, and it will also be apparent that the device is susceptible of considerable modification without material departure from the principles and spirit of the invention, and for this reason I do not desire to be understood as limiting myself to the precise formation and arrangement of the parts herein set forth in carrying out my invention in practice. For example, in some cases the transmitting means shown in Figs. 11, 12 and 13 may be substituted for that shown in the preceding views with good results. As shown in these latter views, a plurality of floats are arranged in the lock 10 as shown at 78, 78, and are capable of a predetermined extent of movement instead of having a varying stroke dependent upon the height of the water in the basin or receptacle 1. These floats 78, 78 are guided for vertical movement in openings 77, 77, produced in a horizontal partition extended across the lock 10, the water being admitted from the wicket 9 to one end of a passage beneath said partition until it has reached a level sufficient to lift the floats to the limit of their upward movement, after which such water is discharged by way of the wicket 11 so as to permit the floats to fall by gravity to their lowermost position. The floats 78 have stems 79 extended up from them and connected by links 84 with cranks 85 in a crank shaft 86 mounted in bearings above the lock, the stems being guided in slide bearings 80 of any preferred kind. The movement of the shaft 86 may be transmitted by means of a pulley 87 to perform any desirable work. The gates 45 and 46 are actuated in a manner similar to that above described, from the movement of the floats 78, excepting that the stems of said floats have fixed arms 81 and 82 which are engageable with fixed stops 83, 83 upon the slide rods 49 and 69 for controlling the movement of the gates from the ascending movement of said floats.

Having thus described my invention, what I claim as new and desire to secure by Letters Patent is:

1. A device of the character described comprising a basin adapted to contain a fluid, an auxiliary basin, a lock interposed between the basins, a canal leading to the basin and into which the auxiliary basin discharges, means for controlling the communications between the canal and both of the basins and a transmitting means within the lock operated by the passage of the fluid from the basin to the auxiliary basin.

2. A device of the character described comprising a basin adapted to contain a fluid, an auxiliary basin of greater area than the basin, a lock interposed between the basins, a canal leading to the basin and into which the auxiliary basin discharges, means for controlling the communications between the canal and both of the basins and a transmitting means within the lock operated by the passage of the fluid from the basin to the auxiliary basin.

3. A device of the character described comprising a basin adapted to contain a fluid, an auxiliary basin, a lock interposed therebetween, a fluid supplying means for the basin into which the auxiliary basin discharges, float valves for controlling the communication of the fluid supplying means with both of the basins and a transmitting means within the lock actuated by the passage of the fluid from the basin to the auxiliary basin.

4. A device of the character described comprising a basin adapted to contain a fluid, an auxiliary basin, means leading from tide water to supply fluid to the basin, said auxiliary basin discharging within said means, float valves controlling the communication of the fluid supplying means with both of the basins, a lock interposed between the basins, and a transmitting means within the lock operated by the passage of the fluid from the basin to the auxiliary basin.

5. A device of the character described comprising a basin, an auxiliary basin, a lock interposed between the basins, means leading from tide water to supply fluid to the basin, said auxiliary basin being in communication therewith, a float valve for controlling the communication of the basin with the supplying means controlled by the fluid within the basin, a float valve for controlling the communication of the auxiliary basin with the supplying means controlled by the fluid within said supplying means and a transmitting means within the lock operated by the passage of the fluid from the basin to the auxiliary basin.

6. A device of the character described comprising a basin, an auxiliary basin, a lock interposed therebetween and in communication therewith, a transmitting means within the lock operated by the passage of fluid from the basin to the auxiliary basin and means for automatically controlling the communication of the lock with the basin and the auxiliary basin.

7. A device of the character described comprising a basin, an auxiliary basin, a lock interposed therebetween and in communication therewith, a transmitting means within the lock operated by the passage of fluid from the basin to the auxiliary basin and means for alternately and automatically opening and closing the communications between the lock and the basins.

8. A device of the character described comprising a basin, an auxiliary basin, a lock interposed therebetween and in communication therewith, means for alternately and automatically controlling the communications between the lock and the basins, and transmitting means within the lock operated by the rise and fall of fluid therein in its passage from the basin to the auxiliary basin.

In witness whereof I have hereunto signed my name, in the presence of two subscribing witnesses.

WILLIAM SCHWEIKERT.

Witnesses:
W. E. LAWSON,
W. C. ABBOTT.